3,562,965
Patented Feb. 16, 1971

3,562,965

METHOD AND APPARATUS FOR PREPARING A PLURALITY OF DISC-SHAPED SEMICONDUCTOR CRYSTALS FOR SIMULTANEOUS WORKING BY A TOOL

Herbert Lange, Ubersee (Chiemsee), Germany, assignor to Siemens Aktiengesellschaft, Berlin and Munich, Germany Filed Dec. 26, 1967, Ser. No. 693,645
Claims priority, application Germany, Mar. 3, 1967, S 108,629
Int. Cl. B24b *1/00, 9/00*
U.S. Cl. 51—283 1 Claim

ABSTRACT OF THE DISCLOSURE

A plurality of disc-shaped semiconductor crystals are cemented at a second surface of each to a carrier at distances from the carrier which coplanarly position the first surfaces of the crystals in a manner whereby the plane of the first surfaces and the working surface of the tool are coincident.

DESCRIPTION OF THE INVENTION

The present invention relates to a method and apparatus for preparing a plurality of disc-shaped semiconductor crystals for simultaneous working by a tool. More particularly, the invention relates to a method and apparatus for preparing a plurality of disc-shaped semiconductor crystals for simultaneous working of a first of two spaced parallel surfaces of each of the crystals by a tool. The working includes lapping, buffing, polishing, and the like.

In the processing of semiconductor discs, a plurality of the discs are usually cemented on a round carrier. The carrier is usually a disc and the semiconductor discs are affixed to the carrier in a predetermined pattern such as, for example, in a circle. The semiconductor discs are then lapped, polished, or otherwise worked. During the working of the semiconductor discs, said discs are pressed in the direction of the carrier, so that the cement or adhesive utilized to affix said discs to said carrier is forced out from between said discs and said carrier to a considerable extent. The pressure of the tool on the semiconductor discs may be so great that said discs are pressed into contact with the holding surface of the carrier.

The aforedescribed process has many serious shortcomings. There may be considerable losses of material. Furthermore, the process cannot be used at times such as, for example, primarily when a thin surface region of the semiconductor discs is removed, which surface region was produced by epitaxy and/or by diffusion on the surface of the semiconductor discs. It must be expected that the first and second spaced surfaces of the semiconductor discs are not completely in parallel with each other, even when said discs have diameters of fractions of a millimeter.

The principal object of the present invention is to provide a new and improved method and apparatus for preparing a plurality of disc-shaped semiconductor crystals for simultaneous working by a tool. The method and apparatus of the present invention position the surfaces of the semiconductor crystals to be worked on in coplanar relation with the plane of said surfaces coincident with the working surface of the tool. The apparatus of the present invention is of simple structure and functions with efficiency, reliability, effectiveness and accuracy to coplanarly position the surfaces of the semiconductor crystals to be worked.

In accordance with the present invention, a method of preparing a plurality of disc-shaped semiconductor crystals for simultaneous working of a first of two spaced substantially parallel surfaces of each of the crystals by a tool comprises cementing the crystals at the second of the two surfaces of each to a carrier at distances from the carrier which coplanarly position the first surfaces of the crystals in a manner whereby the plane of the first surfaces and the working surface of the tool are coincident.

The crystals are positioned with their first surfaces in coplanar relation. The carrier is positioned with its holding surface a determined distance from the second surface of one of the crystals. Adhesives are applied to the second surface of each of the crystals to fill the spaces between the holding surface of the carrier and the second surfaces of the crystals. The crystals are held by air pressure in position with their first surfaces coplanar.

In the method of the present invention, the crystals are cemented at the second of the two surfaces of each to a carrier at distances from the carrier which coplanarly position the first surfaces of the crystals whereby the crystals are so supported that the plane of their first surfaces is coincident with the working surface of a tool. The first surfaces of the crystals and the working surface of the tool are placed in contact with each other so that even at the instant of first contact the working surface of the tool and the plane of the first surfaces are coincident. The crystals and the tool are moved relative to each other.

In accordance with the present invention, apparatus for preparing a plurality of disc-shaped semiconductor crystals for simultaneous working by a tool, each of the semiconductor crystals having first and second spaced substantially parallel surfaces, comprises support means supporting the semiconductor crystals with their first surfaces in coplanar relation. A carrier having a substantially planar holding surface is positioned with the holding surface spaced from but adjacent the second surfaces of the crystals and parallel to the plane of the first surfaces of the crystals. An adhesive in the spaces between the second surfaces of the crystals and the holding surface of the carrier affixes the crystals to the carrier. The support means comprises a base, a plurality of columns extending from the base, each of the columns having a planar support surface in coplanar relation with the planar support surfaces of the others of the columns and adapted to support a corresponding one of the semiconductor crystals, and suction means at the base of each of the columns for holding the semiconductor crystals on the support surfaces by air pressure. The adhesive comprises adhesive wax.

In order that the present invention may be readily carried into effect, it will now be described with reference to the accompanying drawings, wherein.

Figures 1, 2:
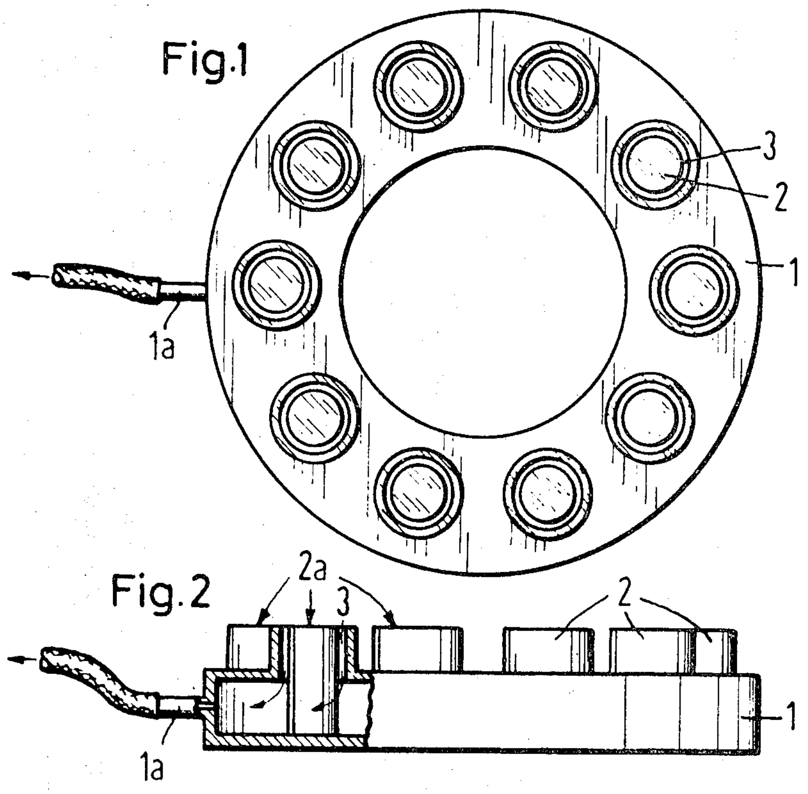
FIG. 1 is a top view of an embodiment of the support member of the apparatus of the present invention.
FIG. 2 is a side view of the support member of FIG. 1.

A support member 1 comprises a base and a plurality of columns 2 extending from said base in the same direction. The columns 2 have the same dimensions (FIGS. 1 and 2) and are equiangularly positioned relative to each other. Each of the columns 2 has a planar support surface 2*a* in coplanar relation with the planar support surfaces of the others of said columns. For the purposes of illustration, ten columns 2 are shown extending from an annular base, although any suitable number of columns may be utilized and the base of the support member 1 may be of any sutiable configuration.

A suction device 3 (FIG. 1) is provided at the base of each of the columns 2. The suction devices 3 function to hold the corresponding semiconductor crystals on their support surfaces 2*a* by air pressure. Each suction device 3 may comprise a ring of small suction holes or a single annular suction hole. The suction holes of the suction devices 3 are coupled by suitable conduits, including the hollow interior of the annular base of the support member 1, to a suction pump (not shown in the figures) which may be connected to a conduit 1*a* extending from said annular base.

The support surfaces 2*a* of the columns 2 are carefully made coplanar by suitable polishing, lapping and the like. The diameter of each of the columns 2 is somewhat smaller than the diameter of the semiconductor disc to be supported thereon.

Figure 3:
FIG. 3 is an axial sectional view of an embodiment of the positioning member of the apparatus of the present invention.
Figure 4:
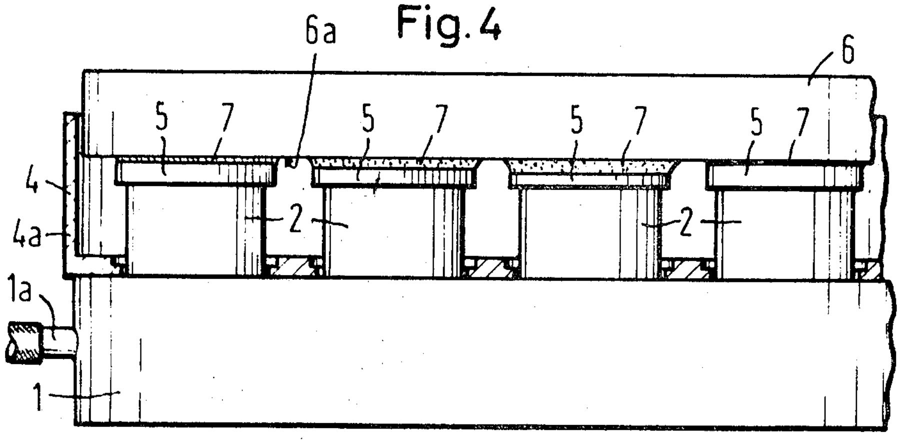
FIG. 4 is a view, partly in section, of an embodiment of a carrier, the support member of FIGS. 1 and 2, and the positioning member of FIG. 3 of the apparatus of the present invention.
Figure 5:
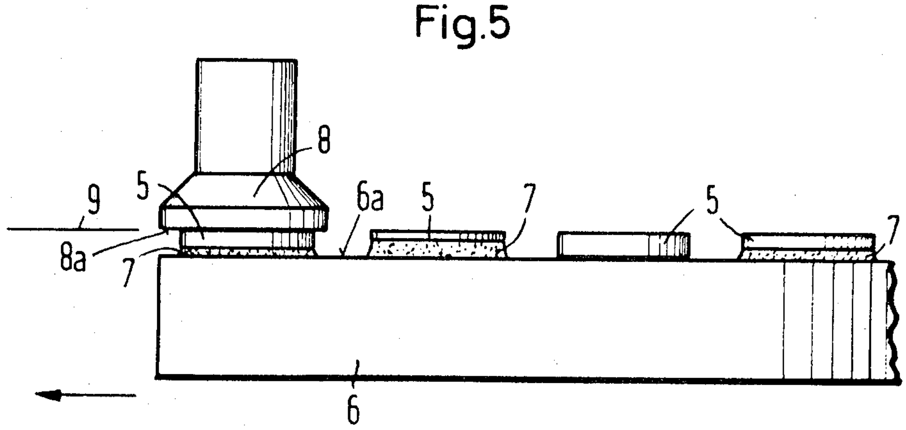
FIG. 5 is a side view of the carrier with the semiconductor discs affixed thereto of the apparatus of the present invention and the tool.

A positioning member 4 (FIGS. 3 and 4) transports a plurality of semiconductor crystals 5 of disc configuration (FIGS. 3 and 4) to the support surfaces 2*a* of the columns 2. Each of the semiconductor crystals has first and second spaced substantially parallel surfaces. The first surface of each semiconductor disc 5 is that which is to be buffed, polished, lapped, or otherwise worked on. The second surface of each semiconductor disc 5 is that which is to be affixed to a carrier or carrier member 6 (FIGS. 4 and 5).

The positioning member 4 has a plurality of recesses formed through the bottom thereof in the same pattern as that of the columns 2 of the support member 1. Each of the semiconductor discs 5 is supported in a corresponding one of the recesses of the positioning member 4 with its first surface down and its second surface up.

The support member 1 and the positioning member 4 are fitted together so that the columns 2 of said support member enter into the corresponding recesses of said positioning member. The support surface 2*a* of each column 2 abuts the first surface of the semiconductor disc 5 supported in the recess of the positioning member 4 through which said column passes. As the column 2 continues to move upward through the corresponding recess of the positioning member 4, said column raises the corresponding semiconductor disc 5 out of said recess until said semiconductor disc is supported only on the support surface 2*a* of said column (FIG. 4).

Once the support surface 2*a* of each column 2 has abutted the first surface of the corresponding semiconductor disc 5, the suction devices 3 are actuated and function to hold the semiconductor discs on the corresponding columns.

A suitable cement or adhesive 7 such as, for example, wax such as beeswax, is placed on the second surface of each semiconductor disc 5 (FIGS. 4 and 5); each said second surface being up (FIG. 4).

The carrier or carrier member 6 may be of disc configuration (FIGS. 4 and 5) and is heated to a temperature above the melting point of the wax 7. The carrier 6 has a substantially planar holding surface 6*a* (FIGS. 4 and 5) and is positioned with said holding surface in contact with the wax 7 on the second surface of each semiconductor disc 5 (FIG. 4). The positioning member 4 has a peripheral flange 4*a* (FIGS. 3 and 4) which serves to guide the carrier 6 so that its holding surface 6*a* moves into abutment with the wax 7 on each semiconductor crystal 5.

The carrier 6 moves toward the semiconductor discs 5 until it is supported by the adhesive on three of said semiconductor discs. The carirer 6 comes to rest with its holding surface 6*a* parallel to the plane of the first surfaces of the semiconductor discs 5, which first surfaces are coplanarly positioned by the support surfaces 2*a* of the columns 2 of the support member 1.

The spaces between the holding surface 6*a* of the carrier member 6 and the second surfaces of those semiconductor discs 5 which do not have sufficient adhesive 7 on them to reach said holding surface are then filled in with adhesive, such as melted wax. The wax 7 may be melted to its liquid condition, in which case it fills the appropriate spaces by capillary action. The affixing of the semiconductor discs 5 to the carrier 6 may be hastened by hastening solidification of the wax adhesive 7, and this may be accomplished by cooling said carrier by any suitable cooling means.

When the semiconductor discs 5 have been affixed to the carrier member 6, said carrier member and said semiconductor discs affixed thereto are removed from the positioning member 4. The first surfaces of the semiconductor discs 5 are coplanarly positioned. Thus, the working surface 8*a* of a tool 8 (FIG. 5) which buffs, laps, polishes, or otherwise works on, the first surfaces of the semiconductor discs 5, is coincident with the common plane of said first surfaces and works on said first surfaces simultaneously and with accurate results. Even at the instant of first contact, the working surface 8*a* of the tool 8 and the plane 9 of the first surfaces of the semiconductor discs 5 are coincident (FIG. 5).

The first surfaces of the semiconductor discs 5 and the planar working surface 8*a* of the tool 8 are brought into contact by any suitable means (FIG. 5) customarily utilized in lapping and polishing machines and the like. The semiconductor crystals 5 and the tool 8 are then moved relative to each other, as indicated by the arrow in FIG. 5. The working surface 8*a* of the tool 8 may be large enough so that it covers all the semiconductor crystals 5 simultaneously.

While the invention has been described by means of a specific example and in a specific embodiment, I do not wish to be limited thereto, for obvious modifications will occur to those skilled in the art without departing from the spirit and scope of the invention.

I claim:

1. A method for simultaneous working of a plurality of wafer-shaped semiconductor crystals having substantially planar parallel surfaces and substantially the same thickness and affixed to the planar surface of a common carrier and moved with the common carrier along the planar surface of a tool for working said crystals, said method comprising the steps of supporting the crystals to be processed at one of their planar surfaces on a support member by suction in a manner whereby the surfaces of the crystals facing the support member are coplanarly positioned;

coating the surface of each of the crystals farther from the support member with adhesive material;

adhering the carrier to the farther surfaces of the crystals by positioning said carrier with its planar surface in abutment with the adhesive on said farther surfaces;

removing the support member; and mounting the crystals affixed to the carrier on the tool in a manner whereby the work surface of the tool coincides with the coplanar surfaces of the crystals to be processed even during the initial contact.

References Cited

UNITED STATES PATENTS

| | | | |
|---|---|---|---|
| 3,475,867 | 11/1969 | Walsh | 51—277X |
| 3,453,783 | 7/1969 | Queen | 51—131X |
| 2,883,803 | 4/1959 | Stead | 51—131 |
| 1,284,283 | 11/1918 | Flad | 51—277 |
| 3,041,800 | 7/1962 | Heisel | 51—277 |
| 2,838,892 | 6/1958 | Blash | 51—277 |
| 2,509,211 | 5/1950 | Clement | 51—277 |

FOREIGN PATENTS

| | | | |
|---|---|---|---|
| 446,823 | 5/1936 | Great Britain | 51—277 |

JAMES L. JONES, Jr., Primary Examiner

U.S. Cl. X.R.

51—277